United States Patent
Nishimaki et al.

[15] 3,670,917
[45] June 20, 1972

[54] STORAGE TANKS FOR ULTRA LOW TEMPERATURE LIQUIDS

[72] Inventors: Ko Nishimaki; Isamu Yoshikawa, both of Osaka, Japan

[73] Assignee: Hitachi Shipbuilding and Engineering Co., Ltd.

[22] Filed: Nov. 4, 1970

[21] Appl. No.: 86,850

[52] U.S. Cl.............................220/10, 220/9 LG, 220/9 F, 220/15
[51] Int. Cl..........................................B65d 7/22
[58] Field of Search..................220/9 LG, 10, 15, 63 R, 9 F; 114/74 A

[56] References Cited

UNITED STATES PATENTS

| | | | |
|---|---|---|---|
| 2,684,171 | 7/1954 | Ernst | 220/15 |
| 2,711,841 | 6/1955 | Schaefer et al. | 220/63 R |
| 2,892,563 | 6/1959 | Morrison | 220/15 |
| 2,928,565 | 3/1960 | Glasoe, Jr. | 220/15 X |
| 3,245,571 | 4/1966 | Canty et al. | 220/15 |
| 3,331,525 | 7/1967 | Coehn | 220/15 |
| 3,370,738 | 2/1968 | Kesling | 220/9 F |
| 3,397,662 | 8/1968 | Basile et al. | 114/74 A |
| 3,401,816 | 9/1968 | Witt | 220/15 |
| 3,495,732 | 2/1970 | Clarke et al. | 220/10 |
| 3,583,351 | 6/1971 | Gorman | 220/15 |

Primary Examiner—Joseph R. Leclair
Assistant Examiner—James R. Garrett
Attorney—Farley, Forster and Farley

[57] ABSTRACT

Fastening means for attaching a heat-insulating layer to an ultra low temperature liquid storage tank, comprising a fastening member of the same material as the tank and bonded to the outer surface of the tank by a low temperature adhesive thereby substantially preventing stresses from developing in the adhesive layer between the fastening member and the tank as a result of large variations in temperature. A nut is welded to the fastening member and a fastening bolt made of a synthetic resin of low thermal conductivity is studded in the nut. The bolt is used to fasten the heat-insulating layer to the outer surface of the tank, thereby firmly fastening the heat-insulating layer to the tank while satisfactorily suppressing heat transfer between the tank interior and the outside.

7 Claims, 5 Drawing Figures

INVENTORS
KO NISHIMAKI
BY ISAMU YOSHIKAWA
Farley, Forster & Farley
ATTORNEYS

STORAGE TANKS FOR ULTRA LOW TEMPERATURE LIQUIDS

BACKGROUND OF THE INVENTION

Heat-insulating layers for ultra low temperature storage tanks used for liquefied methane and other low temperature liquids are formed by fastening molded plates of synthetic foam such as polyurethane foam to the outer surface of a tank in layers with fastening clips. In fastening such molded plates to such a tank the fastening clips may be made of a low thermal conductivity plastic to substantially reduce thermal transfer, and may be bonded to the tank material of nickel steel, aluminum or stainless steel by an adhesive. However, since there are large variations in the temperature of the tank due to charging and discharging of ultra low temperature liquids, there are correspondingly large expansions and contractions of the tank. The adhesive layer between the fastening attachments of plastic and the tank, which are greatly different in their coefficients of linear thermal expansion, is subject to high stresses due to the expansion and contraction differences, and the repetition of such stresses will cause the fastening attachments to peel off in a short time.

SUMMARY OF THE INVENTION

The present invention provides a fastening means utilizing a fastening member of the same material or a material having substantially the same thermal coefficient of expansion as the metal plate of the tank. A nut is welded to the outer surface of the fastening member, a fastening bolt of synthetic resin is studded in the nut, and the fastening member is bonded with a low temperature adhesive to the outer surface of the tank. The fastening bolt of synthetic resin is used for fastening the heat-insulating layers to the tank. Even if there are substantially large changes in the temperature of the tank, the stresses produced in the adhesive layer between the tank and the fastening member remain sufficiently low and the fastening member remains firmly bonded to the tank with the low temperature adhesive. The fastening bolt, which is made of a synthetic resin having a low thermal conductivity, permits substantially little heat transfer even if the bolt extends through the heat-insulating layer thus minimizing heat transfer through the fastening means.

The invention is most beneficial in the use of ultra low temperature liquid storage and cargo tanks such as for the transport of liquefied natural gas, however the invention is not limited thereto and may be used whenever the effects of cyclic temperature variations and heat transfer on insulated storage tanks must be minimized.

DESCRIPTION OF THE PREFERRED EMBODIMENTS

In the following embodiments the invention is described as applied to a liquefied gas storage tank used in an ultra low temperature liquefied gas cargo ship, however the invention is also applicable to low temperature liquid storing tanks designed for other uses.

Figure 1:
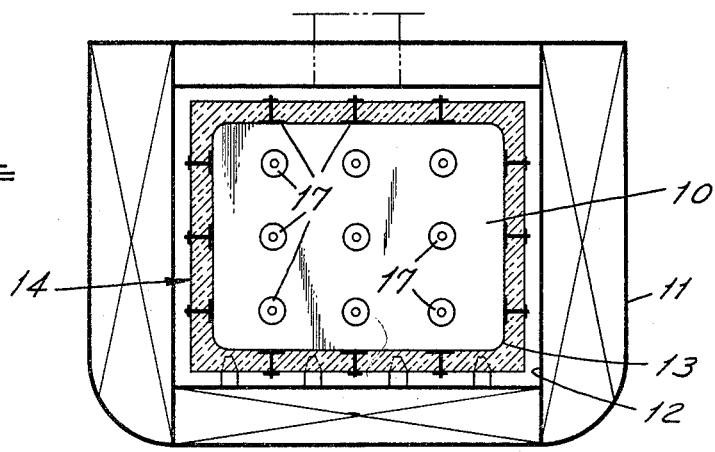
FIG. 1 is a schematic cross-section showing a liquefied gas cargo tank installed in an ultra low temperature liquid cargo ship.

Referring to FIG. 1, an ultra low temperature liquid cargo tank 10 is installed in the hold of a cargo ship hull 11. The tank is surrounded by a steel plate 12 forming part of the hull, with a fixed clearance therebetween to allow for the thermal expansion and contraction of the tank. The tank 10 is formed of low temperature resistant metal plate 13 such as nickel steel, aluminum or stainless steel.

Figure 2:
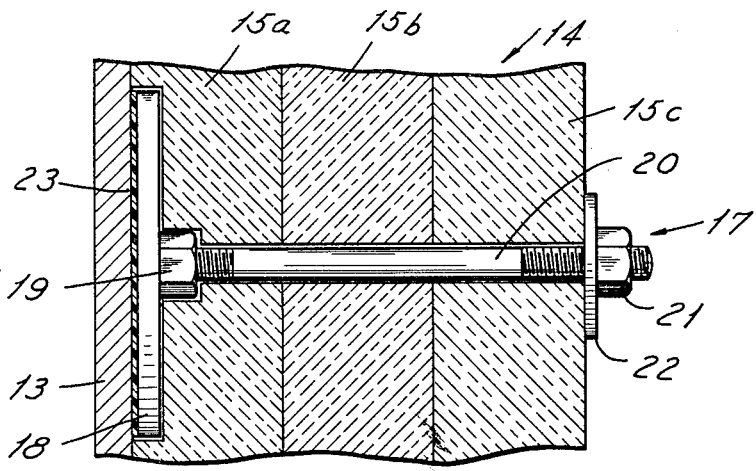
FIG. 2 is a section through the wall of the tank of FIG. 1 showing molded heat-insulating layers fastened to the tank.

As shown in FIG. 2, a heat insulating layer 14 formed on the outer side of this tank plate 13 may be constructed by laminating a plurality of preformed slabs 15a, 15b and 15c of heat-insulating material such as molded hard polyurethane foam of suitable thickness.

Figure 3:
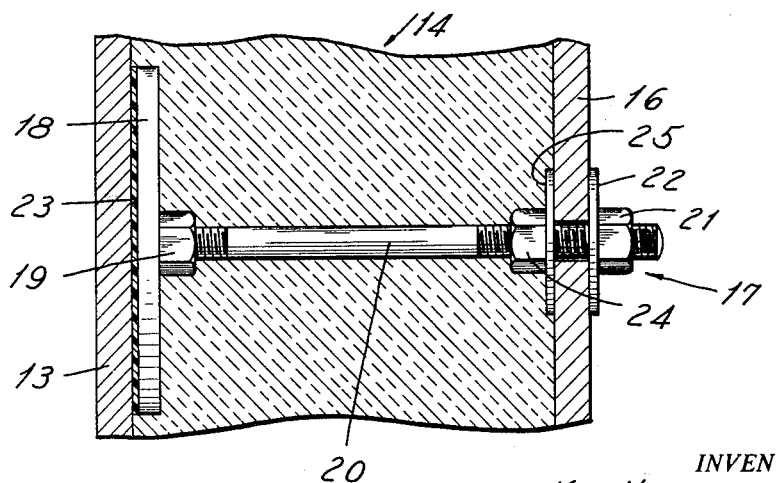
FIG. 3 is a sectional view similar to FIG. 2 showing a foamed-in-place heat-insulating layer fastened to the tank.

Alternately, as shown in FIG. 3, the heat-insulating layer 14 may be formed in place by field-foaming hard polyurethane between the tank plate 13 and a molding form 16 of plywood, aluminum sheet or the like disposed at a fixed distance from the tank plate 13.

The fastening means 17 of the present invention is used for fastening any of these heat insulating layers 14. This fastening means 17 comprises a fastening plate or member 18 of the same material or a material having substantially the same coefficient of thermal expansion as the tank plate 13.

Attachment means of low thermal conductivity is carried by the fastening member to secure the heat insulating layer to the tank and in FIG. 2 includes a nut 19 welded to the outer surface of the fastening member 18, a bolt 20 of synthetic resin studded in the nut 19, a clamping nut 21 and a washer 22. A suitable number of such fastening means are used per unit area of the heat insulating layer. The fastening of the fastening means 17 to the tank plate 13 is effected by applying a low temperature adhesive 23 to the fastening member 18 and pressing the fastening member to the tank plate 13 at a predetermined position. Since the low temperature adhesive 23 is made of resin, adhesion will be improved if a primer is applied in advance to the tank plate 13 and fastening is carried out after drying.

As shown in FIG. 2, the laminated heat-insulating slabs 15a, 15b and 15c may be placed onto the bolt 20 and secured by a nut 21 and a washer 22.

The foamed-in-place heat-insulating layer 14 of FIG. 3 may be formed by screwing a seat nut 24 in advance onto the outer end portion of the bolt 20, fitting a molding frame 16 onto the bolt 20 with a washer 25 interposed, and clamping the molding frame in position 16 with the washer 22 and nut 21.

If welding is used in fastening the fastening member 18 to the tank plate 13, several problems arise. The ultra low temperature tank plate is a thin special material requiring a high level technique for welding. The clearance space outside the tank is narrow so as to cause inconvenience in performing a welding operation.

However, resorting to the use of adhesives in the present invention obviates these problems and fastening can easily be accomplished with much lower skills. Further, since the fastening member 18 is of the same material or has substantially the same thermal coefficient of expansion as the tank plate 13, these parts will expand and contract substantially the same amount when an ultra low temperature liquid is charged into or discharged from the tank 10. Excessive stresses in the adhesive layer will be substantially prevented thus maintaining a strong bond. Further, since the bolt 20 is exposed to the outside, this bolt is made from a synthetic resin whose thermal conductivity is extremely low. The transfer of heat is thereby limited and the heat-insulating layer can be fastened properly in a simple manner.

A variety of low temperature adhesives 23 may be utilized for bonding the fastening member 18 to the tank plate 13. The results of tests conducted by the applicants using epoxy type, polyurethane type, phenol type and silicone type adhesives have revealed that the silicone type is the best.

Figure 4:
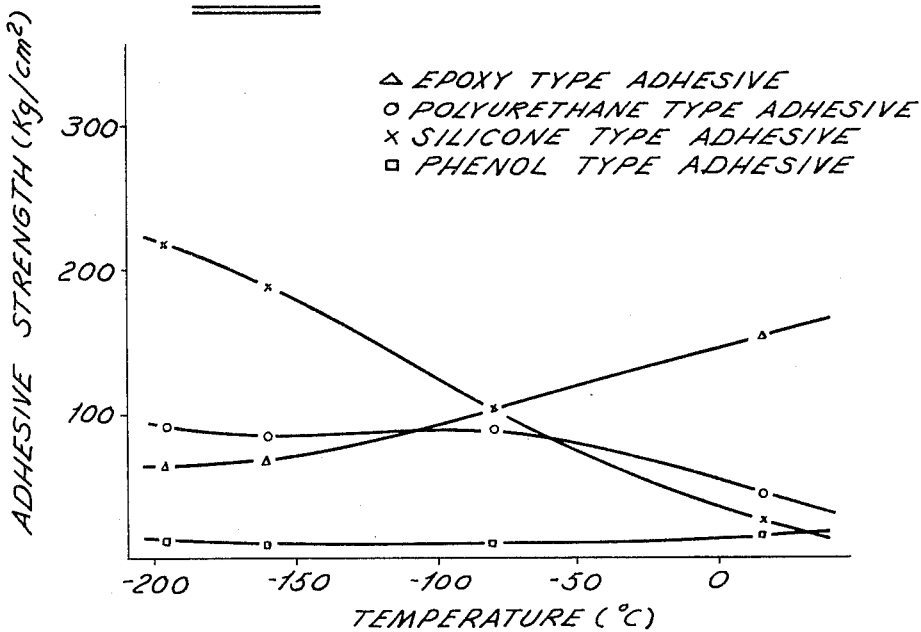
FIG. 4 is a graph showing variation in adhesive strength as a function of temperature in test pieces bonded with various types of low temperature adhesives.

FIG. 4 graphically presents test data showing the relationship between temperature and adhesive strength in the direction of tensile shearing. The test was conducted in the following manner:

Test pieces (ASTM D 1002) were partially overlapped and bonded in pairs with the four types of adhesives mentioned above. After bonding, the test pieces were left in a room for 20 days. Those of the test pieces which were to be tested at +15° C., −80° C. and −160° C. were placed in an ultra low temperature tank testing machine, and left for 10 minutes at their respective predetermined temperatures. They were then tested at a tensile shearing rate of 10 mm/min.. The other pieces to be tested at −196° C. were placed in another testing machine, where they were immersed in liquid nitrogen for 10 minutes and then tested.

The test discloses that in the ultra low temperature region the silicone type is decidedly superior.

Figure 5:
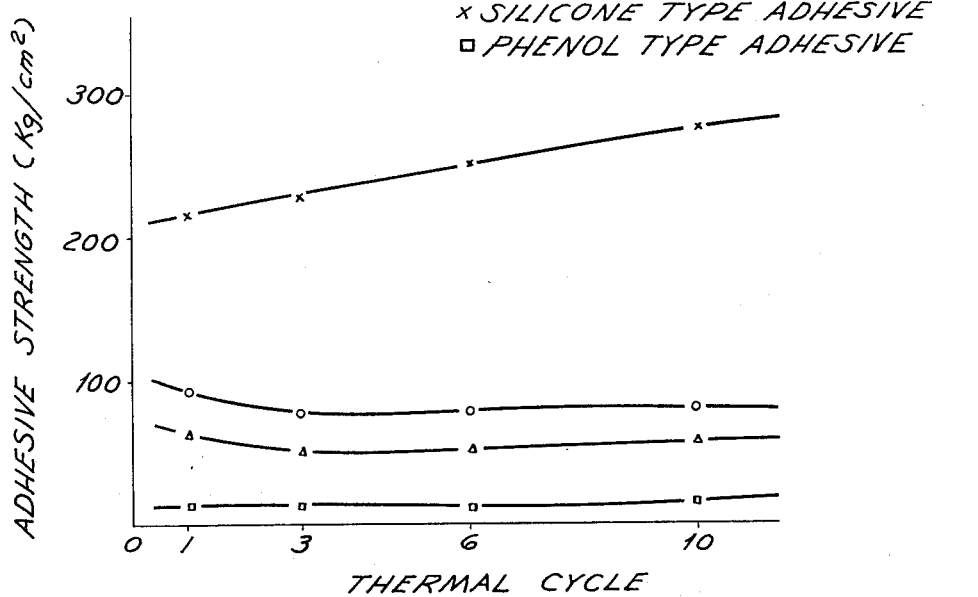
FIG. 5 is a graph showing durability as a function of cyclic temperature variation in the test pieces of FIG. 4.

FIG. 5 illustrates test data on high and low temperature cycle frequency versus tensile shearing stress. The test indicates durability performance relative to repetition of high and low temperatures. The test was conducted in the following manner:

The same test pieces as used in the preceding adhesive strength test were bonded in pairs with the four types of adhesives and left in a room for 20 days. They were then subjected to thermal cycling by immersion in liquid nitrogen (−196° C.) for 3–5 hours followed by removal to a chamber at ordinary temperature for 6 days. After the lapse of 1, 3, 6 and 10 of the above cycles the test pieces were subjected to a tensile shearing test in the same manner as the adhesive strength test at −196° C. described above.

The test discloses that the silicone type adhesive has the highest durability.

The results of a tearing test (ASTM D 1062) were as follows:

In this test, test pieces were bonded in pairs with the various adhesives and left at room temperature for 1 week. Those pairs which were to be tested at −160° C. were subsequently held in an ultra low temperature bath for 2 hours. Each pair was subjected to a tensile test by loading the pair at one end of the adhesive layer in a direction perpendicular to the plane of the adhesive layer and at a rate increasing the load 272–318Kg per minute.

The test discloses that silicone type adhesives have the highest tearing tensile strength (Kg/cm²) in the ultra low temperature (−160° C.) region.

Tearing Tensile Strength Test (Kg/cm²)

|  | +15°C | | | −160°C | | |
|---|---|---|---|---|---|---|
|  | Lowest | Highest | Mean | Lowest | Highest | Mean |
| Epoxy Type Adhesive | 400 | 520 | 470 | 290 | 300 | 295 |
| Polyurethane Type Adhesive | 290 | 425 | 350 | 700 | 850 | 713 |
| Silicone Type Adhesive | 55 | 80 | 70 | 1210 | 1350 | 1288 |
| Phenol Type | 30 | 55 | 40 | 20 | 30 | 23 |

While the three kinds of test data given above refer to test pieces made of stainless steel bonded in pairs, it has been ascertained that test results using test pieces made of aluminum or steel are substantially no different from those described above.

As is obvious from the various tests described above, silicone type adhesives, which are strong at ultra low temperature, which have satisfactory durability and which are easy to use, are most suitable for use as low temperature adhesives. In order to check the practicability for the bonding of the fastening plate 18 and the tank plate 13, the following test was conducted:

A nut was welded at three spots in the center of a circular plate having a diameter of 80 mm and a thickness of 2–3 mm and an acrylic bolt was screwed into the nut. Units of the above construction were secured together in pairs by bonding their plates with a silicone type adhesive, were left in a room for 10 days to cure, and were then held at +15° C. and −196° C., respectively, for 10 minutes. A tensile load was imposed on the two bolts of each pair. As a result, the acrylic bolts broke at a test temperature 15° C. under a load of 100 Kg. In a subsequent test, instead of acrylic bolts, steel bolts were used.

The following data were obtained.

Fastening Plate Adhesive Strength Test

| Strength Test temp. (°C) | Adhesive Strength | | | Average |
|---|---|---|---|---|
|  | 1 | 2 | 3 |  |
| +15 | 250 | 320 | 300 | 290 |
| −196 | 1100 | 1000 | 1000 | 1033 |

At −196° C. and a load of about 1,000 Kg all pairs broke at the weld between the nut and the fastening plate. The adhesive layer bore no trace of abnormality and exhibited a strong adhesive strength.

Thus, the tests disclose that the adhesive layer will satisfactorily meet the stress requirements including those caused by the weight of the heat-insulating layer 14 resting on the fastening means 17 disposed principally on the lateral wall of the tank 10; those caused by the foaming pressure of a foamed-in-place heat-insulating layer 14; and those caused by the thermal expansion and contraction differences between the molding frame 16 and the tank plate 13.

Because the fastening plate and the tank plate are made of materials having substantially identical coefficients of thermal expansion bonded together by a low temperature adhesive, the fastening means according to the present invention will not peel off the tank plate and the installation of the heat-insulating layer can be performed easily and quickly. Thus, the invention is most suitable for use as a heat-insulating layer fastening means for ultra low temperature liquid storage tanks.

We claim:

1. A storage tank for low temperature liquids wherein said tank has a heat-insulating layer applied to the outer surface thereof and an improved fastening means for securing the heat-insulating layer to the tank, said fastening means comprising:

a fastening member of a material having substantially the same coefficient of thermal expansion as the material of said tank secured to the outer surface of said tank, attachment means of low thermal conductivity carried by the fastening member to secure the heat-insulating layer to the tank, and an adhesive capable of withstanding low temperatures bonding said fastening member to said tank.

2. A low temperature liquid storage tank according to claim 1 wherein said fastening member is formed of the same material as the material of said tank.

3. A low temperature liquid storage tank according to claim 1 wherein said heat-insulating layer comprises a plurality of superimposed slabs of preformed synthetic resin foam and said attachment means includes an elongated fastening element extending through said slabs and secured to the outermost slab.

4. A low temperature liquid storage tank according to claim 1 wherein the attachment means includes a molding form, an elongated fastening element securing the molding form to the fastening member in spaced relation with the outer surface of the tank, and a synthetic resin material foamed in the space between the molding form and the tank to form the heat-insulating layer.

5. A low temperature liquid storage tank according to claim 1 wherein the low temperature adhesive bonding said fastening plate to said tank is a silicone type of adhesive.

6. A low temperature liquid storage tank according to claim 1 wherein said attachment means include a nut secured to said fastening member and an elongated fastening element of low thermal conductivity threaded into said nut.

7. A low temperature liquid storage tank according to claim 6 wherein said fastening element is formed of a synthetic resin material.

* * * * *